Patented Oct. 22, 1940

2,218,679

UNITED STATES PATENT OFFICE 2,218,679

CEMENTITIOUS MATERIAL

Dean S. Hubbell, Pittsburgh, Pa., assignor to H. H. Robertson Company, Pittsburgh, Pa., a corporation of Pennsylvania No Drawing. Application June 9, 1938, Serial No. 212,760

7 Claims. (Cl. 106—29)

This invention relates to a cement, and particularly to a cement of the sorrel type.

The invention has for an object to produce an improved cement of the sorrel type, and more particularly to improve the weather and water resistance of the cement and cementitious material forming the subject matter of my United States Letters Patent Nos. 2,058,984, 2,058,985, 2,058,986, and 2,058,987, and in certain other respects, as will be pointed out.

With this general object in view and such others as may hereinafter appear, the invention consists in the cement and cementitious material hereinafter described and particularly defined in the claims at the end of this specification.

Prior to my inventions with respect to the improvements in magnesium oxychloride cement and other cements of the sorrel type, forming the subject matter of my United States Letters Patent above referred to, magnesia cements have been heretofore disqualified from many industrial and commercial uses because of the extent to which their cementing constituent dissolves in water forming a dilute solution of magnesium chloride. It has been found that if this magnesium chloride is not removed as rapidly as it forms, it accelerates the disintegration of the cement due to the even greater solubility of magnesium chloride in it than in water.

As set forth in my said patents, the weather and water resistance and strength of the ordinary cements of the sorrel type and more particularly of the magnesium oxychloride cements has been markedly increased by the addition to such cements of finely divided copper or finely divided cuprous oxide, and mixtures of such materials, in a proportion substantially less than the amount of the cement.

After a cement produced in accordance with my said patents has hardened and also during the hardening process, a characteristic bluish-green color is developed in the cementitious material comprising an insoluble copper compound, probably a basic copper chloride, which is disposed in the voids between the particles of the cement aggregate.

In accordance with the present invention, the weather and water resistance and strength of such copper bearing cements of the sorrel type, and more particularly of such copper bearing magnesium oxychloride cements, may be further enhanced and improved in an economical and practical manner by incorporating minor amounts of finely divided metallic lead in the copper bearing cements. In practice mixtures of finely divided lead with either finely divided metallic copper or with finely divided cuprous oxide, or both, may be incorporated in the magnesium oxychloride or other cement of the sorrel type.

While lead powder alone does not, as far as I am able to discover, improve the water resistance or other practical characteristics of magnesium oxychloride cements, it has been found that the combinations of metallic lead powder with finely divided copper and/or finely divided cuprous oxide developed increased water resistance and strength in the cementitious compositions in which they are embodied, and such improvement becomes particularly noticeable after an aging period of thirty days or more. Experience has demonstrated that wet strength measured after thirty days, and after longer periods of time following the setting of the cement, comprises a good criterion of the water resistance of the various cement compositions under study.

In practice it is preferred to utilize combinations of lead powder and copper powder or cuprous oxide in finely divided conditions, and each reagent may be employed in various percentages, depending upon the use to which the cement is to be put, but I have experienced very satisfactory results utilizing proportions of powdered lead up to 10% of the weight of the cement in combination with amounts of finely divided copper or finely divided cuprous oxide in amounts up to 10%. In practice and for most industrial and commercial purposes it is preferred to employ an amount of finely divided metallic material selected from the group consisting of finely divided copper, cuprous oxide and lead, substantially less than the amount of the cement, but it is not desired to limit the invention in this respect. The following table gives the results of the wet tensile strength at indicated ages in months with magnesium oxychloride cement embodying percentages of copper powder and lead powder; and from which it is apparent that the lead powder alone has little or no effect upon the tensile strengths of the cements, whereas in the combination with the copper powder the wet tensile strengths are markedly increased.

*Wet tensile strengths at indicated ages*

| Composition | 1 month | 3 months | 6 months | 9 months |
| --- | --- | --- | --- | --- |
| 0% copper, 5% lead | 285 | 300 | 320 | |
| 3% copper, 2% lead | 453 | 480 | | |
| 3% copper, 5% lead | 675 | 978 | 873 | |
| 5% copper, 5% lead | 551 | 819 | 955 | 1,010 |
| 5% copper, 3% lead | 458 | 743 | 845 | |
| 10% copper, ½% lead | 660 | 774 | 1130 | |
| 10% copper, 5% lead | 579 | 958 | 1050 | |

Lead is one of the cheapest of the metals and is obtainable in a finely divided form at a very slight differential from the ingot price. The reaction product in the cement is white, and in addition, when incorporated therein, produces a very volume constant cement. The improved cement embodying copper and lead powders possesses the advantages of the cement produced in accordance with my patents above referred to using copper powder or cuprous oxide alone, or mixtures thereof, and in addition the use of the lead powder enables a substantial saving in the cost of metallic reagents to be obtained, and at the same time a cement of a lighter color is produced, enabling desirable decorative effects and surface finishes to be obtained.

Having thus described the invention, what is claimed is:

1. A non-porous cementitious material possessing improved weather and water resistance comprising a magnesium oxychloride cement containing finely divided metallic material in an amount substantially less than the amount of the cement, said metallic material comprising in part finely divided cooper and in part finely divided lead.

2. A non-porous cementitious material possessing improved weather and water resistance comprising a magnesium oxychloride cement containing finely divided metallic material in an amount substantially less than the amount of the cement, said metallic material comprising in part finely divided lead, and in part a reagent selected from the group consisting of finely divided copper and finely divided cuprous oxide.

3. A non-porous cementitious material possessing improved weather and water resistance comprising a magnesium oxychloride cement containing finely divided metallic material in an amount substantially less than the amount of the cement, said metallic material comprising finely divided lead, copper and cuprous oxide.

4. A non-porous cementitious material possessing improved weather and water resistance comprising a magnesium oxychloride cement containing a finely divided metallic material comprising in part finely divided copper and in part finely divided lead.

5. A non-porous cementitious material comprising a major proportion of cement of the sorrel type containing an aggregate forming voids between the particles thereof and a minor proportion of a metallic material comprising copper and lead in metallic form distributed throughout the cementitious mass, and an insoluble copper compound disposed in the voids.

6. A non-porous cementitious material possessing improved weather and water resistance comprising a magnesium oxychloride cement containing finely divided metallic material comprising in part finely divided lead and in part a reagent selected from the group consisting of finely divided copper and finely divided cuprous oxide.

7. A non-porous cementitious material possessing improved weather and water resistance comprising a magnesium oxychloride cement containing a minor proportion of a finely divided metallic material consisting essentially of copper and lead.

DEAN S. HUBBELL.